United States Patent
Wuidart et al.

(10) Patent No.: US 6,927,580 B2
(45) Date of Patent: Aug. 9, 2005

(54) DETECTION OF A VARIATION IN THE ENVIRONMENT OF AN INTEGRATED CIRCUIT

(75) Inventors: Sylvie Wuidart, Pourrieres (FR); Luc Wuidart, Pourrieres (FR); Michel Bardouillet, Rousset (FR); Pierre Balthazar, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 17 days.

(21) Appl. No.: 10/234,830

(22) Filed: Sep. 4, 2002

(65) Prior Publication Data

US 2003/0117148 A1 Jun. 26, 2003

(30) Foreign Application Priority Data

Sep. 4, 2001 (FR) ............................................ 01 11435

(51) Int. Cl.[7] .............................................. G01R 27/28
(52) U.S. Cl. ........................................ 324/617; 324/612
(58) Field of Search ................................ 324/617, 612; 702/72, 79, 89, 106; 327/261, 263, 269–271, 262; 714/715, 815, 745

(56) References Cited

U.S. PATENT DOCUMENTS

| 4,041,386 | A |   | 8/1977  | Thomas et al. ........... 324/76.18 |
|-----------|---|---|---------|------------------------------------|
| 5,036,460 | A |   | 7/1991  | Takahira et al. ............. 364/200 |
| 5,252,867 | A | * | 10/1993 | Sorrells et al. ............. 327/152 |
| 5,313,503 | A | * | 5/1994  | Jones et al. .................. 375/376 |
| 5,382,899 | A | * | 1/1995  | Funatsu et al. ......... 324/207.18 |
| 5,534,805 | A | * | 7/1996  | Miyazaki et al. ............ 327/144 |

OTHER PUBLICATIONS

French Search Report from French Patent Application No. 01/11435, filed Sep. 4, 2001.

* cited by examiner

Primary Examiner—Anjan Deb
Assistant Examiner—John Teresinski
(74) Attorney, Agent, or Firm—Lisa K. Jorgenson; James H. Morris; Wolf, Greenfield & Sacks, P.C.

(57) ABSTRACT

A method and a circuit for detecting variations of at least one environmental parameter of an integrated circuit, including evaluating a propagation delay of an edge in delay elements sensitive to variations of the environmental parameter, and comparing the present or measured delay with at least one reference value.

31 Claims, 3 Drawing Sheets

DETECTION OF A VARIATION IN THE ENVIRONMENT OF AN INTEGRATED CIRCUIT

BACKGROUND OF THE INVENTION

1. Field of the Invention

The present invention relates to the field of integrated circuits and, more specifically, to the detection of variations of environmental parameters of an integrated circuit in operation.

2. Discussion of the Related Art

Systems for monitoring variables linked to the environment of an integrated circuit such as temperature, supply voltage, etc., are used to detect a possible violation of the integrated circuit chip in protected systems. It may, for example, be a matter of detecting possible interventions external to the integrated circuit with the intention of pirating the data contained therein. This last application more specifically concerns smart cards.

Another example of application of systems for monitoring an environmental variable of an integrated circuit is the authorization of operation of such a circuit with respect to a range, for example, of temperatures, for which the circuit is intended.

Generally, monitoring elements are dedicated to a given variable. For example, a threshold voltage is used to detect possible temperature variations, and the results of the measurement are analogically interpreted to determine a possible violation of the external environment of the chip.

A disadvantage then is that the number of detection circuits must be multiplied by the number of variables or parameters which are desired to be monitored.

Another disadvantage is that the obtaining of an analog measurement requires a conversion to be interpreted by a digital system generally equipping the integrated circuit chip, to decide of the consequences of the possible violation.

Another disadvantage is that a variation in the environmental parameters may occur without any violation of the chip. For example, the external temperature conditions may be notably modified (several tens of degrees). It would be desirable to be able to distinguish a variation linked to a violation from a variation linked to a normal change in operating conditions.

SUMMARY OF THE INVENTION

The present invention aims at providing a novel method for detecting variations of at least one environmental parameter of an integrated circuit which overcomes the disadvantages of known solutions.

The present invention more specifically aims at providing a solution which, by means of the same circuit, enables monitoring several environmental parameters of the integrated circuit.

The present invention also aims at detecting a difference of the environmental parameters with respect to a reference value.

The present invention also aims at providing a solution avoiding use of analog-to-digital converters of the measurement results.

The present invention further aims at enabling automatic adaptation of the detection system to normal environment variations.

To achieve these and other objects, the present invention provides a method for detecting variations of at least one environmental parameter of an integrated circuit, comprising:

evaluating a propagation delay of an edge in delay elements sensitive to variations of the environmental parameter; and comparing the present or measured delay with at least one reference value.

According to an embodiment of the present invention, a measured delay is compared with two predetermined threshold values defining an allowed operating range of the integrated circuit.

According to an embodiment of the present invention, a present or measured delay is compared with a single reference value.

According to all embodiment of the present invention, the value of a programmable delay element is controlled according to the difference between the current value and the reference value, the possible variation range being, preferably, predetermined.

According to an embodiment of the present invention, said difference is compared with two predetermined threshold values.

According to an embodiment of the present invention, a time of reading from flip-flops having their respective inputs connected at the output of the delay elements is synchronized to provide a binary word forming an evaluation of the present or measured propagation delay.

The present invention also provides an integrated circuit, including:

a network of delay elements individually connected to flip-flops, the respective inputs of which define bits of a detection word linked to at least one environmental parameter of the integrated circuit; and means for comparing said present word with at least one binary reference word.

According to an embodiment of the present invention, said delay elements are in parallel and have their common input terminal connected at the output of a programmable delay element, an input terminal of which forms an input terminal of the detection circuit.

According to an embodiment of the present invention, said comparator provides a word for configuring the programmable delay element based on a comparison of the present or measured value with a reference value.

According to an embodiment of the present invention, the circuit includes means for determining a variation range of the programmable delay.

According to an embodiment of the present invention, said delay elements are in series.

According to an embodiment of the present invention, the circuit further includes an average delay element interposed between a read triggering signal terminal and the respective clock inputs of the different flip-flops.

The foregoing objects, features and advantages of the present invention, will be discussed in detail in the following non-limiting description of specific embodiments in connection with the accompanying drawings.

DETAILED DESCRIPTION

Figure 1:
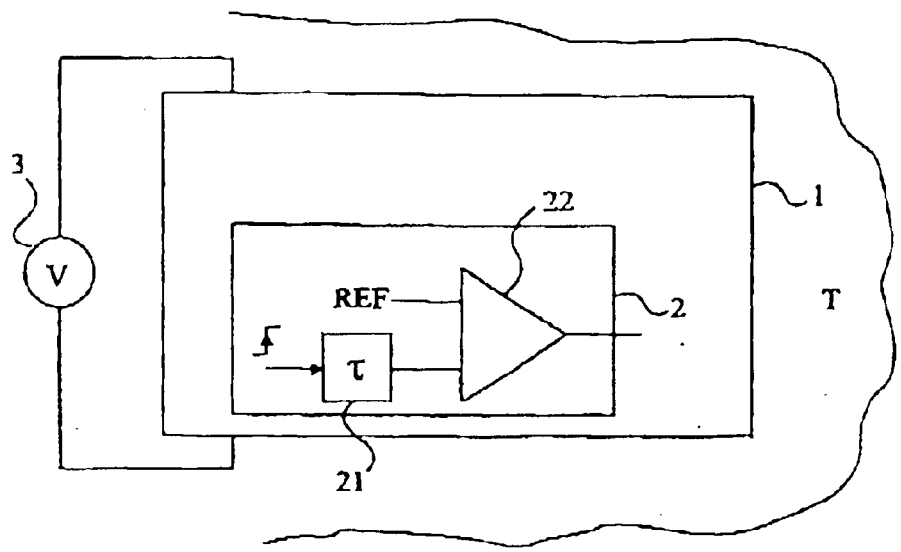
FIG. 1 shows, in a simplified view, an integrated circuit equipped with a detection circuit according to the present invention.

The same elements have been designated with the same references in the different drawings. For clarity, only those elements which are necessary to the understanding of the present invention have been shown in the drawings and will be described hereafter. In particular, the exploitation of the results of the detection to forbid access to the data or for any other use is within the abilities of those skilled in the art.

A feature of the present invention is to evaluate a propagation delay of an electric signal in delay elements which are individually sensitive to variations in the integrated circuit environment.

The present invention takes advantage of the fact that many environmental parameters of an integrated circuit, that is, parameters which are not directly linked to the internal circuit structure, for example, temperature or the circuit supply voltage, are likely when they vary to modify the propagation delays of a signal in an electric path.

Thus, the present invention uses this property to detect variations, more specifically with respect to a reference value, of one or several environmental parameters of the integrated circuit, without it being necessary to directly measure this or these parameter(s).

FIG. 1 schematically shows an embodiment of an integrated circuit 1 equipped with a detection circuit 2 according to the present invention. Only circuit 2 has been shown in the form of a block contained in integrated circuit 1, which for the rest is an ordinary circuit.

Circuit 1 is supplied by at least one supply voltage V provided, for example, by a generator 3. Supply voltage V of circuit 1 forms, in the sense of the present invention, an environmental parameter of this circuit. Another environmental parameter illustrated in FIG. 1 is temperature T to which circuit 1 is submitted. Temperature T may result from the internal heating of the circuit due to its operation or from an external source. In all cases, this also is, according to the present invention, an environmental parameter. Other environmental parameters may influence the propagation time of a signal. These are, for example, the stability of the supply voltage, humidity, radiation, etc.

According to the present invention, detection circuit 2 essentially includes a circuit 21 for measuring the propagation time of an edge triggering a measurement, more specifically, a state switching of a binary signal. The output of circuit 21 is connected to the input of a comparator 22 having another input receiving a comparison reference REF. The output of comparator 22 provides the result of a possible difference of the delay with respect to the reference delay.

Figure 2:
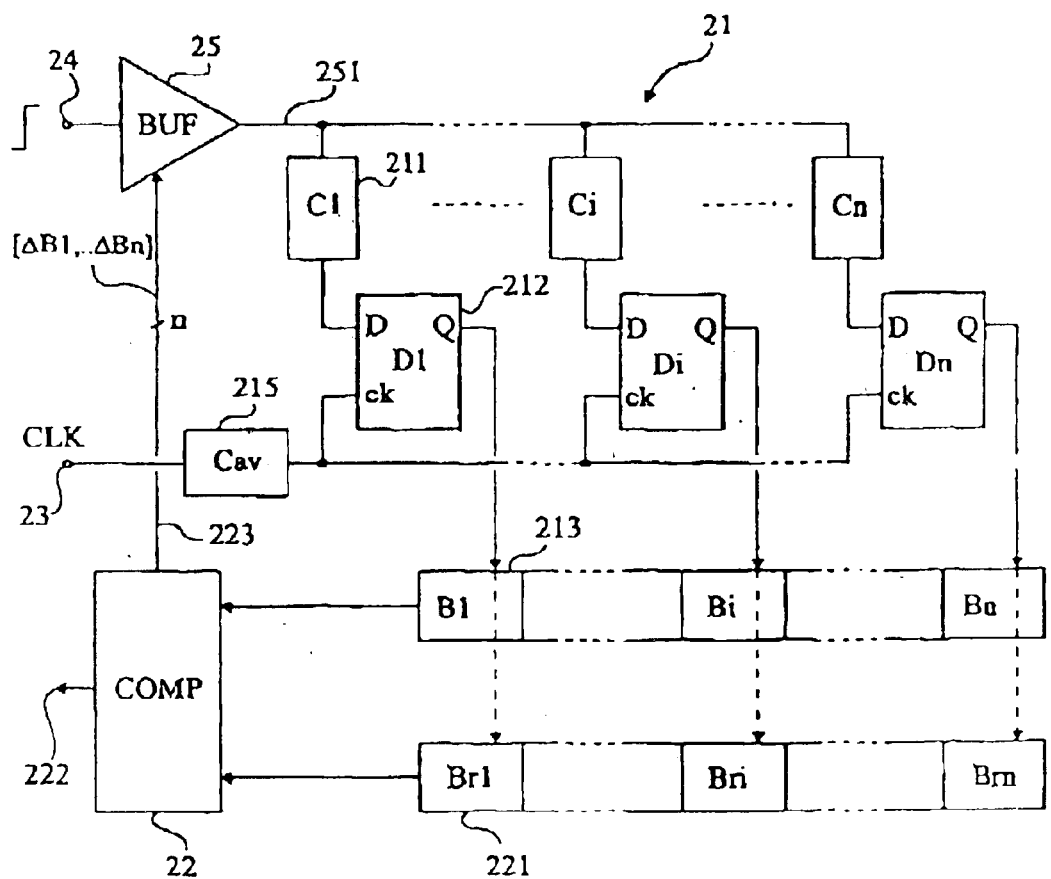
FIG. 2 shows a first embodiment of a detection circuit according to the present invention.

FIG. 2 shows a first embodiment of a detection circuit 2 according to the present invention.

Circuit 21 for measuring the propagation times essentially includes n delay elements 211 (C1, . . . , Ci, . . . , Cn) or electric paths preferentially introducing delays different from one another. The respective outputs of elements 211 are connected to the data inputs (D) of n flip-flops 212 (D1, . . . , Di, . . . , Dn). The respective outputs (for example, the direct Q outputs) of flip-flops 212 directly provide n bits (B1, . . . , Bi, . . . , Bn) of a binary word representative of the performed measurement For example, the word bits are inscribed in a register 213 or any other analog temporary storage element.

In the embodiment illustrated in FIG. 2, the different delay elements 211 are connected in parallel with respect to one another. Their respective input terminals are thus interconnected. An edge to which the different delays are desired to be applied is applied on an input terminal 24 of circuit 2. Terminal 24 is connected to an input circuit 25 introducing an adjustable delay and being used, as will be seen hereafter, for an automatic adaptation (calibration) of circuit 2. Circuit or "adjustable buffer" 25 (BUF) has its output 251 connected to the respective inputs of delay elements 211.

The respective clock inputs Ck of flip-flops 212 are interconnected so that the reading of the binary states present at the input of the different flip-flops is simultaneous for the n flip-flops.

Preferably, a read triggering signal CLK applied on a terminal 23 of circuit 2 crosses an additional delay element 215. Element 215 introduces a delay corresponding to the average delay (Cav) of the different electric paths introduced by elements 211 (taking into account flip-flops 212 adding an identical delay for all paths).

Delay element 215 is optional. It has the function of enabling use of a signal CLK corresponding to the binary signal providing the edge on terminal 24. In this case, terminals 23 and 24 are connected. Delay element 215 then enables delaying the reading of the data present on the inputs of flip-flops 212 by the time necessary for the average propagation in electric paths 211. As an alternative, the circuit (not shown) generating the measurement edge provides the clock signal of the flip-flops with a delay. It is, for example, a processor (integrated or not to circuit 1) for controlling the variations and triggering the adapted actions.

When an edge is applied on input terminal 24, this edge reaches the respective D inputs of flip-flops 212 at different times according to the significance of the delays due to the respective elements 211 as well as to the delay linked to circuit 25 common to all electric paths. All electric paths generating a delay greater than delay Cav corresponding to element 215 provide a bit at state "0" since the edge applied on input 24 has not reached them yet. All paths generating a delay smaller than delay Cav provide a bit at state "1" since the edge reaches the D input of the corresponding flip-flop before expiry of delay Cav.

The possible variation of the delay of the different paths gives an indirect indication of the drift of the external environment of the integrated circuit, be it in terms of temperature or supply voltage.

To form delay elements 211 of the electric paths, any integrated element that may constitute a delay element may be used. The delay elements may be, for example, oxide capacitors or metal resistors. Of course, the delay elements may take other forms, provided they are sensitive to the environmental parameters which are desired to be measured for the circuit. Further, the choice of the variation range of the delays introduced by the different elements depends on the desired application and sensitivity.

Circuit 2 further includes a comparator 22 (COMP), a first input of which receives the binary word B1, . . . , Bi, . . . , Bn temporarily stored in register 213, and a second reference input of which receives a reference binary word (Br1, . . . , Bri, . . . , Brn) previously stored in a register 221 or the like. The result of the comparison is provided on an output terminal 222 of comparator 22.

In the preferred embodiment of FIG. 2, comparator 22 further includes n outputs 223 for circuit 25. These n outputs provide a binary word $\Delta B1, \ldots, \Delta Bn$ of n bits used to recalibrate, if necessary, circuit 25, as will be detailed hereafter.

Preferably, the delays introduced by elements 211 increase (or decrease) along with the significance of the corresponding bit in the word provided by flip-flops 212. The difference between the respective significances of the first bits at state 0 (respectively at state 1) of the measured word and of the reference word then provides an indication of the amplitude of the variation in the environmental parameters. This indication may be used, for example, to calculate the variation speed of the environmental parameters by successive measurements. A relatively slow variation due to normal changes in operating conditions (for example, a static variation of the supply voltage) can then be distinguished from an abrupt variation (for example, a dynamic instability of the supply voltage) due to an attempt to violate the access to the chip data.

The reference binary word stored in register 221 is obtained in a phase of parameterizing of circuit 2. This phase is performed in reference conditions (for example, under a controlled reference supply voltage and at a 25° C. temperature).

According to the preferred embodiment of the present invention, the circuit is then characterized in the operating conditions corresponding to upper and lower limiting conditions. Referring to the example of temperature and of supply voltage, the provided binary word is measured in windows ranging from minimum voltage VccMIN to maximum voltage VccMAX and from minimum temperature TMIN to maximum temperature TMAX of circuit "specification" (operating range guaranteed by the manufacturer).

The circuit characterization phase enables obtaining two limiting binary values surrounding reference value BREF. The difference between the two values corresponds to the authorized range. The limiting values are used to configure (for example, by means of a series of programmable switches) circuit 25 to define a possible adjustment range to slow down or accelerate the edge applied on terminal 24.

The adjusting loop thus obtained then enables, upon each characterization phase, placing the circuit for extracting the measured binary word (electric paths 211, 212) back in reference conditions. The two limiting values of the binary words beyond which the adaptation circuit is no longer sufficient correspond to the limiting environment conditions which have been set.

In operation, as soon as circuit 25 is no longer able to center back the system on the reference word, comparator 22 outputs a signal (in practice, a binary state switching) indicative of a violation of the environment conditions for which the circuit is provided.

An advantage of the present invention is that it provides a circuit of general monitoring of a set of environmental variables of the integrated circuit. Of course, with this sole circuit, it cannot be determined whether the variation is due to one or the other of the parameters. However, the present inventors have found that, most often, what matters is to detect a difference with respect to the authorized operating range of any one of the parameters.

Another advantage of the present invention is that the inputs/outputs of the detection circuit are, due to the very nature of the circuit, digital without it being necessary to perform any conversion.

Another advantage of the present invention is that by allowing a digital calibration or adaptation of element 25, this adaptation is made insensitive to the measured outer conditions (especially temperature).

Another advantage of the present invention is that the circuit is easily integrable in an integrated circuit chip, especially of the smart card type.

Figure 3:
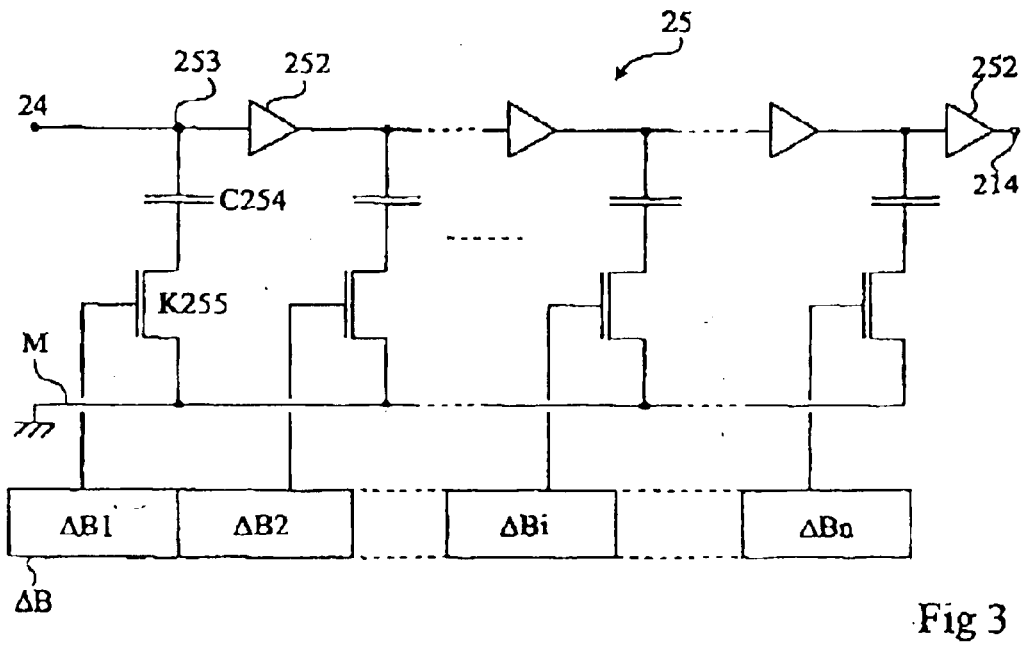
FIG. 3 shows a first embodiment of a circuit for automatically adapting the circuit of FIG. 2.

FIG. 3 shows a first example of a circuit 25 for adapting measurement circuit 2 according to the present invention. In this example, a plurality of gates 252 connected in series between input terminal 24 of circuit 25 and its output terminal 251 are used. Gates 252 are, for example, mere non-inverting elements of buffer type. The respective inputs 253 of gates 252 are individually connected to a first terminal of a capacitor C254 having its other terminal connected to ground (M) by a switch K255 (for example, a MOS transistor). The gates of the different transistors K255 respectively receive one of bits $\Delta B1, \Delta B2, \ldots, \Delta Bi, \ldots, \Delta Bn$ of the programming word provided by comparator 22 (FIG. 2). The respective values of capacitors C254 are different according to the significance of the bit in binary word $\Delta B$. The programming word may be obtained in different ways. For example, the bit-to-bit difference between measured word 213 (FIG. 2) and the reference word may directly be used. More complex means may also be used, for example computer means to perform specific adaptations.

It can thus he seen that a variation of the measured word within the allowed range will respectively turn on or turn off one of switches K255 and, accordingly, cause the insertion of capacitor C254 of the corresponding branch in the delay line formed by elements 252 in series. Each time a transistor K255 turns on, it introduces an additional delay brought by circuit 25.

Figure 4:
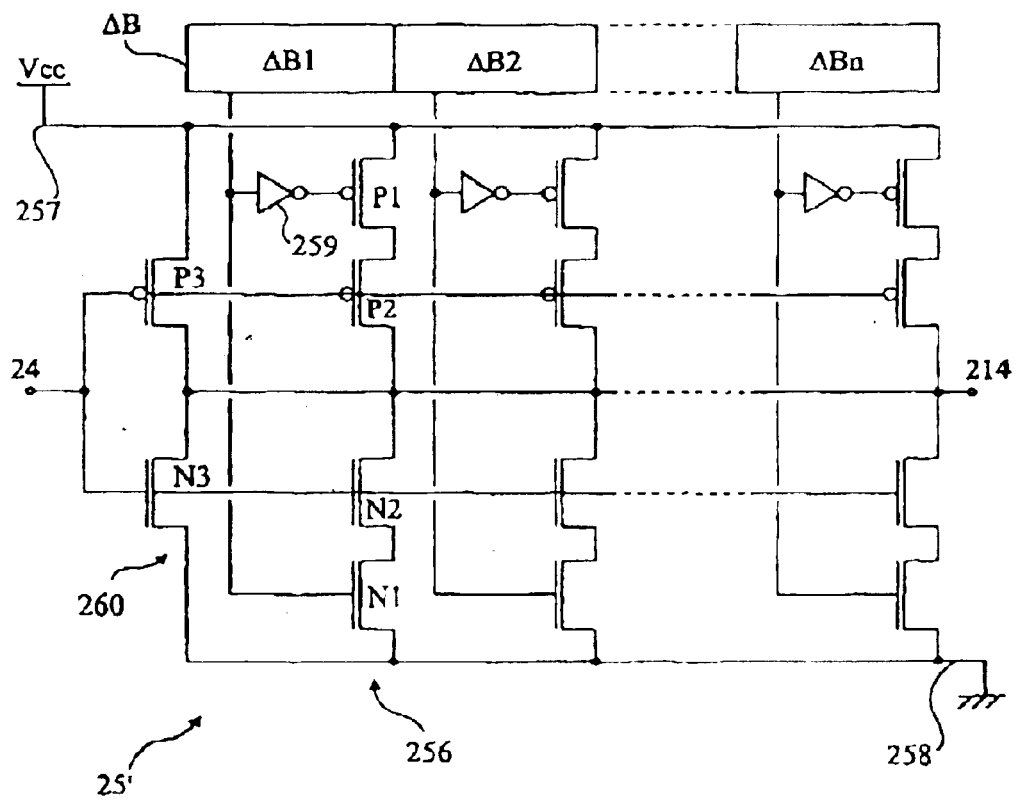
FIG. 4 shows a second embodiment of a circuit for automatically adapting the circuit of FIG. 2.

FIG. 4 shows a second example of embodiment of an adjustable buffer 25' that can be implemented in circuit 2 of FIG. 2.

As in the assembly of FIG. 3, buffer 25' is configured by means of the binary word $\Delta B$ ($\Delta B1, \Delta B2, \ldots, \Delta Bn$) provided by terminal 223 of comparator 22 of FIG. 2. Each bit of this word controls a stage 256 of circuit 25'.

Each stage 256 is formed of two P-channel MOS transistors in series with two N-channel MOS transistors between two terminals 257 and 258 of application of a supply voltage Vcc. A first P-channel MOS transistor P1 has its gate connected to an inverter 259, the input of which receives the corresponding bit $\Delta Bi$. A second P-channel MOS transistor P2 of each stage 256 has its gate connected to input terminal 24 of circuit 25'. Transistors P1 and P2 are in series between terminal 257 and output terminal 214 of circuit 25'. A first N-channel transistor N1 has its gate connected to the application terminal of the corresponding bit $\Delta Bi$. A second N-channel transistor N2 has its gate connected to input terminal 24. Transistors N1 and N2 are in series between terminal 214 and ground terminal 258.

Finally, circuit 25' includes an input stage 260 formed of two transistors, respectively with a P channel P3 and with an N channel N3 connected in series between terminals 257 and 258. The midpoint of this series connection is connected to terminal 214 and the respective gates of transistors P3 and N3 are both connected to terminal 24.

When one of the bits of word $\Delta B$ is at state "1", it turns on the transistors P1 and N1 of the corresponding stage. As long as the signal present on terminal 24 is low (that is, before occurrence of a triggering edge), transistor N3 and all transistors N2 of stages 256 are off. Transistor P3 and transistors P2 of stages 256 are on. In this case, when a bit $\Delta Bi$ is at state "1", terminal 214 is at state "1".

The occurrence of a rising edge on terminal 24 causes the switching of transistors P3 and N3, transistor P3 turning off while transistor N3 turns on. The time when terminal 214 will switch to ground depends on the number of stages 256 made conductive by state "1" of the corresponding bit $\Delta Bi$.

Indeed, the transistors N2 of all stages are turned on upon occurrence of the edge on terminal 24 while all transistors P2 are off at this time. Accordingly, the switching to the low state of terminal 214 increases as the number of conductive stages 256 increases.

Other variable and programmable delay elements usable in the circuit of FIG. 2 may be envisaged, provided that they introduce a delay depending on a configuration binary word ΔB provided by comparator 22.

For example, several inverters or logic gates assembled in series may be used, as in the embodiment of FIG. 3, and the respective outputs of each inverter may be connected to the inputs of a multiplexer. The selection of the multiplexer input provided as an output is then performed by a programming word, for example, word ΔB, previously discussed in relation with FIGS. 3 and 4.

In the foregoing description, a word ΔB over n bits has been considered to simplify the discussion. It should however be noted that the programming of element 25 from the comparison of the current word (register 213) with the reference word (221) may be performed with a different number of bits. The use of a same number of bits however simplifies the comparison by allowing, for example, a bit-to-bit comparison of the current and reference words.

In a preferred application, the detection is periodically performed, which enables permanent control of the reference binary word.

According to an alternative embodiment, binary word ΔB is directly used as a comparison word. Two reference values delimiting an allowed range are stored. A coming out of this range by the current value is then detected. Reference word Br stored in register 221 is then only used to recalibrate the system.

Figure 5:
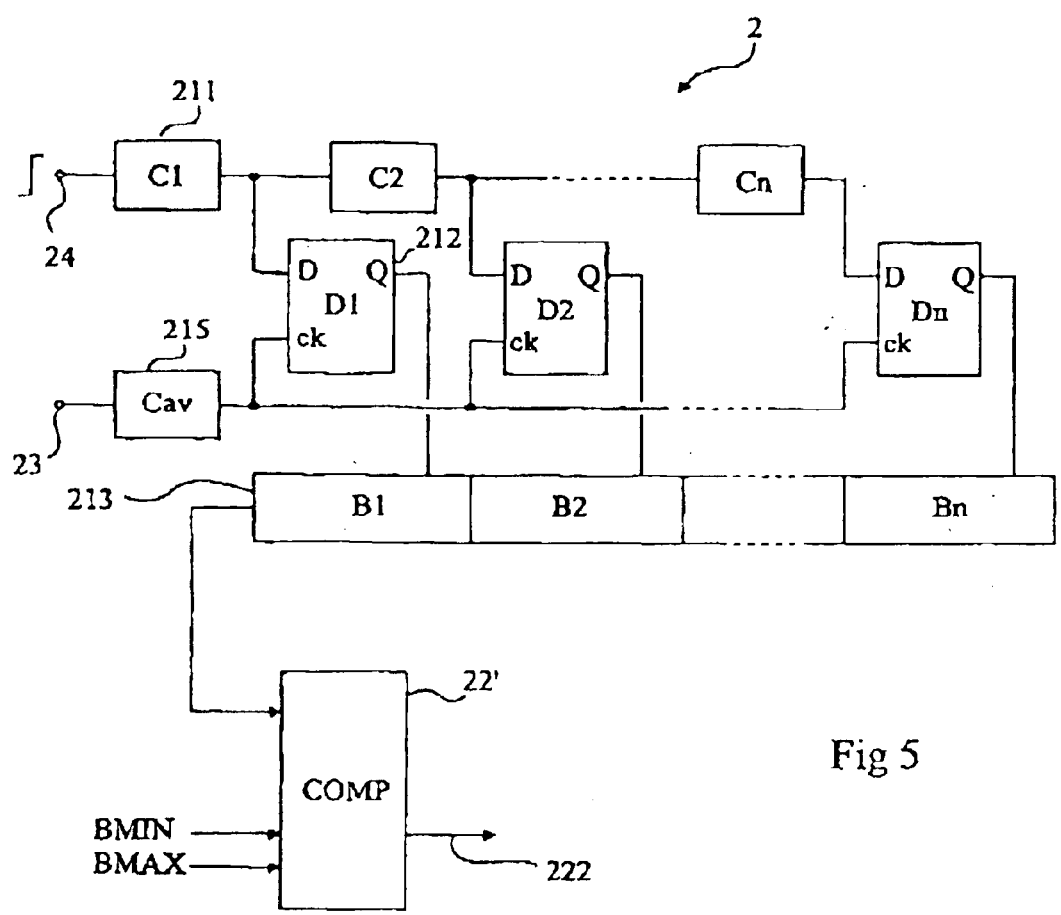
FIG. 5 shows a second embodiment of a detection circuit according to the present invention.

FIG. 5 shows a second embodiment of a circuit for detecting the exceeding of a threshold value by an environmental parameter of the integrated circuit according to the present invention.

This embodiment still uses delay elements 211 and flip-flops 212 to generate a binary word B1, B2, . . . , Bn in a register 213. However, unlike the embodiment of FIG. 2, electric paths 211 are here connected in series. Input D of each flip-flop 212 is accordingly connected between two paths (except for the last one, Dn, connected to the output of path Cn).

As in the embodiment of FIG. 2, an element 215 introducing an average delay Cav having its input connected to terminal 23 of application of the signal triggering the flip-flop reading is used. Input 24 of circuit 2' receives, as in the preceding embodiments, an edge which is successively delayed by the different paths in series.

The major difference of the embodiment of FIG. 5 with respect to the embodiment of FIG. 2 is the absence of programmable delay elements (25, FIG. 2).

In the embodiment of FIG. 5, the binary words corresponding to minimum value BMIN and maximum value BMAX of the allowed range are stored in storage elements (not shown). For example, non-volatile memories may be used. In operation, the measured binary word, temporarily stored in register 213, is compared with the word stored in the non-volatile memory. If the current word is not between the two limiting values BMIN and BMAX, comparator 22' provides on its terminal 222 an indication of violation of the external environment conditions of the integrated circuit.

The electric paths (delay elements 211) being in series, the binary word is successively formed of states "1", then of states "0". The comparison is thus made on the rank of the limit between the "0"s and the "1"s of the binary word.

Of course, the present invention is likely to have various alterations, modifications, and improvement which will readily occur to those skilled in the art. In particular, the practical implementation of the electric paths forming the delay elements is within the abilities of those skilled in the art based on the functional indications and on the envisaged application. For example, according to whether the environmental temperature of the integrated circuit is or not a parameter to be detected, metal or polysilicon resistors will be used.

Further, the length of the detection binary words depends on the allowed variation range and on the desired sensitivity. As a specific example of embodiment, the length of the binary words ranges between 8 and 16 bits.

Finally, the practical forming of comparator 22 to determine both a signal indicative of an environment out of the provided limits and a control signal intended for a variable delay element are within the abilities of those skilled in the art by using conventional means based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for detecting variations of at least one environmental parameter of an integrated circuit, comprising:

evaluating a propagation delay of an edge in delay elements sensitive to variations of the at least one environmental parameter; and determining whether a measured delay value is within a range defined by two threshold values defining an operating range of the integrated circuit by comparing a detection word to at least one reference word, the at least one reference word representing at least one environmental condition.

2. The method of claim 1, wherein the act of determining includes comparing the present measured delay value with the two predetermined threshold values defining an allowed operating range of the integrated circuit.

3. The method of claim 1, wherein the act of determining includes comparing the present measured delay value with a single reference value within the range defined by the two predetermined threshold values, and wherein the two predetermined threshold values define an allowed amount of variation of the present measured delay value from the single reference value.

4. The method of claim 3, including controlling the value of a programmable delay element according to a difference between the present measured delay value and the reference value, the possible variation range being, preferably, predetermined.

5. The method of claim 4, including comparing said difference with two predetermined threshold values.

6. The method of claim 1, wherein the act of determining includes synchronizing a time of reading from flip-flops having their respective inputs connected at an output of the delay elements to provide a binary word forming an evaluation of the present measured delay value.

7. An integrated circuit, including:
   a network of delay elements individually connected to flip-flops, respective inputs of the flip-flops defining bits of a detection word representing at least one environmental parameter of the integrated circuit; and
   means for determining whether a detection word represents a value within a range defined by two threshold values defining an operating range of the integrated circuit by comparing the detection word to at least one reference word, the at least one reference word representing at least one environmental condition.

8. The integrated circuit of claim 7, wherein said delay elements are in parallel and have a common input terminal connected at an output of a programmable delay element, an input terminal of which forms an input terminal of the detection circuit.

9. The integrated circuit of claim 8, wherein said means for determining provides a word for configuring the programmable delay element based on a comparison of a present value with a reference value within the range defined by the two predetermined threshold values, and wherein the two predetermined threshold values define an allowed amount of variation of the present measured delay value from the single reference value.

10. The integrated circuit of claim 9, including means for determining a variation range of the programmable delay.

11. The integrated circuit of claim 7, wherein said delay elements are in series.

12. The integrated circuit of claim 7, further including an average delay element interposed between a read triggering signal terminal and the respective clock inputs of the different flip-flops.

13. An integrated circuit comprising:
   a network of delay elements configured to receive a signal transition, wherein the delay elements are sensitive to at least one environmental parameter of the integrated circuit;
   storage elements individually coupled to the delay elements for storing binary states of the delay elements after the signal transition, wherein the plurality of outputs of the storage elements define a detection word representative of the at least one environmental parameter; and
   storage elements for storing at least one reference word for comparison with the detection word, the at least one reference word representing at least one environmental condition.

14. An integrated circuit as defined in claim 13, further comprising a comparator for comparing the detection word with the reference word.

15. An integrated circuit as defined in claim 14, further comprising a programmable delay circuit, wherein said delay elements are connected to an output of the programmable delay circuit.

16. An integrated circuit as defined in claim 15, wherein the comparator provides a word for configuring the programmable delay circuit based on comparison of the detection word with a reference word.

17. An integrated circuit as defined in claim 13, wherein said delay elements are connected in parallel.

18. An integrated circuit as defined in claim 13, wherein said delay elements are connected in series.

19. An integrated circuit as defined in claim 13, wherein said storage elements comprise flip-flops.

20. An integrated circuit as defined in claim 19, further including an average delay element connected between a read triggering signal and respective clock inputs of the flip-flops.

21. An integrated circuit as defined in claim 13, further comprising means for determining whether the detection word represents a value within a range defined by a first threshold value and a second threshold value.

22. A method for detecting variations of at least one environmental parameter of an integrated circuit, comprising;
   applying a signal transition to a network of delay elements that are sensitive to variations of the at least on environmental parameter;
   evaluating a plurality of binary states of the delay elements after the signal transition to provide a detection word that is representative of the at least one environmental parameter by comparing the detection word to at least one reference word, the at least one reference word representing at least one environmental condition.

23. A method as defined in claim 22, further comprising comparing the detection word with at least one reference word.

24. A method as defined in claim 23, wherein evaluating binary states of the delay elements comprises storing the binary states of the delay elements in storage elements after the signal transition.

25. A method as defined in claim 23, wherein comparing comprises comparing the detection word with two predetermined threshold values to define an allowed operating range of the integrated circuit.

26. A method as defined in claim 23, wherein comparing comprises comparing the detection word with a single reference value.

27. A method as defined in claim 23, further comprising supplying the signal transition to the network of delay elements through a programmable delay circuit and configuring the programmable delay circuit based on a difference between the detection word and the reference value.

28. A method as defined in claim 27, further comprising comparing the difference with two predetermined threshold values which define an operating range of the integrated circuit.

29. A method as defined in claim 23, further comprising clocking the binary states of the delay elements into the storage elements to provide a binary word representative of the at least one environmental parameter.

30. A method as defined in claim 22, wherein applying a signal transition comprises applying the signal transition to the delay elements in parallel.

31. A method as defined in claim 22, wherein applying a signal transition comprises applying the signal transition to the delay elements in series.

* * * * *

UNITED STATES PATENT AND TRADEMARK OFFICE
CERTIFICATE OF CORRECTION

PATENT NO. : 6,927,580 B2
DATED : August 9, 2005
INVENTOR(S) : Sylvie Wuidart et al.

It is certified that error appears in the above-identified patent and that said Letters Patent is hereby corrected as shown below:

Column 2,
Line 14, should read:
-- According to an embodiment of the present invention, the --.

Column 8,
Line 56, should read:
-- 4. The method of claim 3, including controlling a value --.
Line 59, should read:
-- value, a possible variation range being predetermined. --.
Line 62, should read:
-- difference with the two predetermined threshold values. --.

Column 9,
Line 1, should read:
-- 7. An integrated circuit, comprising: --.
Line 32, should read:
-- signal terminal and respective clock inputs of the dif- --.
Line 41, should read:
-- after the signal transition, wherein a plurality of --.
Line 51, should read:
-- with a reference word. --.
Line 59, should read:
-- tion word with a reference value. --.

Column 10,
Line 4, should read:
-- the storage elements comprise flip-flops. --.

UNITED STATES PATENT AND TRADEMARK OFFICE
CERTIFICATE OF CORRECTION

PATENT NO. : 6,927,580 B2
DATED : August 9, 2005
INVENTOR(S) : Sylvie Wuidart et al.

It is certified that error appears in the above-identified patent and that said Letters Patent is hereby corrected as shown below:

<u>Column 10 (cont'd),</u>
Line 29, should read:
-- value. --.

Signed and Sealed this

Eleventh Day of October, 2005

JON W. DUDAS
*Director of the United States Patent and Trademark Office*